Dec. 7, 1948.  J. LAPSENSOHN  2,455,784
FISH SPEAR AND HOOK
Filed Feb. 22, 1945  2 Sheets-Sheet 1
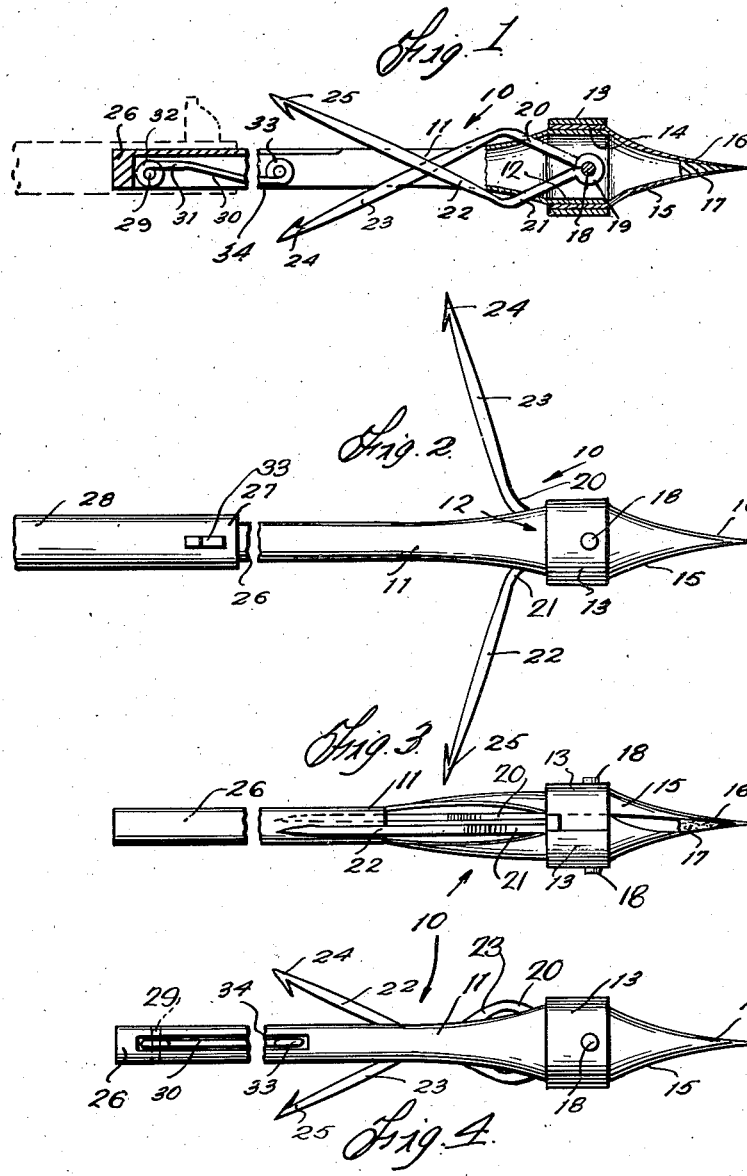
Inventor
Jacob Lapsensohn,
By Clarence A. O'Brien
and Harvey B. Jacobson
Attorneys Dec. 7, 1948.   J. LAPSENSOHN   2,455,784
FISH SPEAR AND HOOK
Filed Feb. 22, 1945   2 Sheets-Sheet 2
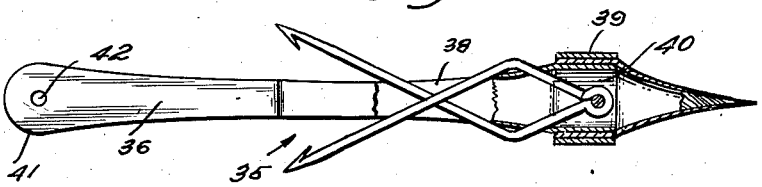
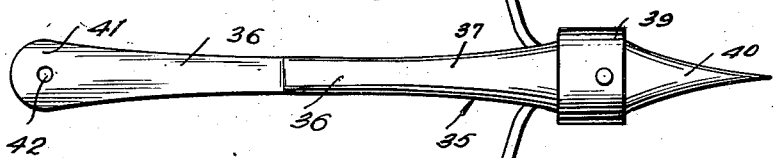
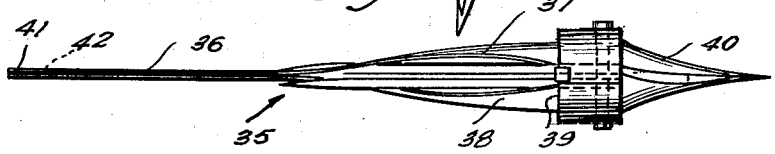
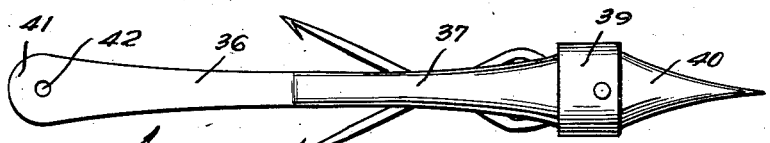
Inventor
Jacob Lapsensohn,
By Clarence A. O'Brien
and Harvey B. Jacobson
Attorneys Patented Dec. 7, 1948

2,455,784

UNITED STATES PATENT OFFICE 2,455,784

FISH SPEAR AND HOOK

Jacob Lapsensohn, Brooklyn, N. Y.

Application February 22, 1945, Serial No. 579,173

3 Claims. (Cl. 43—6)

This invention relates to fishing tackle and has for an object to provide a combination fish spear and hook.

Another object of the invention is to provide a fish spear actuated by compressed air.

A further object of the invention is to provide the combination of a fish hook and spear arranged to shoot from an air rifle.

Other features and advantages will become more readily apparent from the following description and the accompanying illustrative drawings in which:

Figure 1 is a sectional elevation of my invention,

Figure 2 is a plan view of the device,

Figure 3 is a side elevation of the device,

Figure 4 is another elevational view thereof,

Figure 5 is a view similar to Figure 1, showing a modification,

Figure 6 is an elevational view thereof,

Figure 7 is a side elevation of the modification shown in Figure 5, and

Figure 8 is a view similar to Figure 6, the hooks being shown in folded position.

Like reference characters refer to like parts in the drawings and the specification and in which 10, indicates my combination fish spear and hook which consists of a tubular member 11, enlarged at its outer end to form a head 12, upon which is fitted the cylindrical collar 13, securing the inner terminal 14, of a hollow spear 15, to said head. Within the spear portion 16, is a weight 17, which may be provided by pouring molten lead thereinto. A pin 18, is secured transversely to the member 13, upon which is rotatably mounted the eye ends 19, of the angularly disposed arms 20 and 21, being extensions of the shanks 22 and 23, of the hooks 24 and 25. The terminal 26, of member 11 is of a diameter to fit tightly into the free end 27, of the muzzle 28, of an air rifle. Pivotally connected by a pin 29, in said end 26, is a link 30, provided at one end 31, with an eye 32, engaging the pin 29, and an eye 33, is also provided on the other end 34, of said link, to which a fish line may be attached. When the spear is shot from an air rifle the link 30, will swing back into alignment with the member 26.

In Figures 5 to 8, I show a modification of the invention in which the body or shank 35, is formed of flat metal or other material bent upon itself along its rear portion 36, and the sides 37 and 38, of which are spread apart and formed into cylinder 39, to which the spear head 40, is fixed. The rear terminal 41, of the member 35, is provided with an aperture 42, to which a line may be attached. Otherwise, the form of the invention is the same as that of Figures 1 to 4. This modified form of the invention is to be thrown either from the hand of the user or from a line attached thereto.

It is thought that persons skilled in the art to which the invention relates will be able to obtain a clear understanding of the invention after considering the description in connection with the drawings. Therefore, a more lengthy description is regarded as unnecessary.

Minor changes in shape, size and rearrangement of details and parts such as come within the purview of the invention claimed may be resorted to, in actual practice, if desired.

Having now described my invention that which I claim as new and desire to procure by Letters Patent is:

1. A device of the character described including a tubular body portion, a pointed head at one end thereof, a slotted handle portion on the rear end of said body, a bearing pin extending through said tubular body portion, and barbed hooks pivotally supported on said pin in crossed relation and lying in said slotted handle portion.

2. A device of the character described including a tubular body portion, a pointed hollow weighted head at one end thereof, a slotted handle portion on the rear end of said body, a pivot pin extending crosswise of said tubular body portion, crossed barbed hooks pivotally supported on said pivot pin and lying in said slotted handle portion when said device is being projected, and adapted to be moved outwardly when the device has pierced the object at which it was projected.

3. A device of the character described including a tubular body portion, a pointed hollow weighted head at one end thereof, a slotted handle portion on the rear end of said body, a pivot pin extending crosswise of said tubular body portion, crossed barbed hooks pivotally supported on said pivot pin and lying in said slotted handle portion when said device is being projected, and adapted to be moved outwardly when the device has pierced the object at which it was projected, and a pivoted fishing line supporting eye retractably received in said slotted handle portion while the device is being projected.

JACOB LAPSENSOHN.

REFERENCES CITED

The following references are of record in the file of this patent:

UNITED STATES PATENTS

| Number | Name | Date |
|---|---|---|
| 199,926 | Mitchell | Feb. 5, 1878 |
| 206,694 | Taylor | Aug. 6, 1878 |
| 433,674 | D'Arcy-Irvine | Aug. 5, 1890 |
| 1,302,457 | Ureck | Apr. 29, 1919 |
| 2,090,731 | Klein | Aug. 24, 1937 |